(12) United States Patent
Marechal

(10) Patent No.: US 8,394,903 B2
(45) Date of Patent: Mar. 12, 2013

(54) INITIATION SYSTEM FOR THE ANIONIC POLYMERIZATION OF CONJUGATED DIENES, AND METHOD FOR PREPARING DIENE ELASTOMERS

(75) Inventor: Jean-Marc Marechal, Chamalieres (FR)

(73) Assignees: Compagnie Generale des Etablissements Michelin, Clermont-Ferrand (FR); Michelin Recherche et Technique S.A., Granges Paccot (CH)

( * ) Notice: Subject to any disclaimer, the term of this patent is extended or adjusted under 35 U.S.C. 154(b) by 69 days.

(21) Appl. No.: 13/139,757

(22) PCT Filed: Dec. 22, 2009

(86) PCT No.: PCT/EP2009/067747
§ 371 (c)(1),
(2), (4) Date: Jun. 30, 2011

(87) PCT Pub. No.: WO2010/072761
PCT Pub. Date: Jul. 1, 2010

(65) Prior Publication Data
US 2011/0251354 A1 Oct. 13, 2011

(30) Foreign Application Priority Data
Dec. 23, 2008 (FR) .................................... 08 58988

(51) Int. Cl.
| C08F 4/44 | (2006.01) |
| C08F 12/02 | (2006.01) |
| C08F 36/00 | (2006.01) |
| B01J 31/00 | (2006.01) |
| C08C 19/00 | (2006.01) |

(52) U.S. Cl. ........ 526/176; 526/346; 526/335; 502/102; 525/370

(58) Field of Classification Search .................. 526/176, 526/346, 335; 502/102; 525/370
See application file for complete search history.

(56) References Cited

U.S. PATENT DOCUMENTS

| 2,849,432 A | 8/1958 | Kibler et al. |
| 3,935,177 A | 1/1976 | Muller et al. |
| 4,935,471 A | 6/1990 | Halasa et al. |
| 5,153,159 A | 10/1992 | Antkowiak et al. |
| 5,238,893 A | 8/1993 | Hergenrother et al. |
| 5,274,106 A | 12/1993 | Lawson et al. |
| 5,329,005 A | 7/1994 | Lawson et al. |
| 5,332,810 A | 7/1994 | Lawson et al. |
| 5,354,822 A | 10/1994 | Antkowiak et al. |
| 5,393,721 A | 2/1995 | Kitamura et al. |
| 5,420,219 A | 5/1995 | Lawson et al. |
| 5,436,290 A | 7/1995 | Lawson et al. |
| 5,463,003 A * | 10/1995 | Horikawa et al. ............. 526/176 |
| 5,463,004 A | 10/1995 | Horikawa |
| 5,523,364 A | 6/1996 | Engel et al. |
| 5,527,753 A | 6/1996 | Engel et al. |
| 5,550,203 A | 8/1996 | Engel et al. |
| 5,567,815 A | 10/1996 | Hall et al. |
| 5,574,109 A | 11/1996 | Lawson et al. |
| 5,578,542 A | 11/1996 | Lawson et al. |
| 5,605,872 A | 2/1997 | Engel et al. |
| 5,610,227 A | 3/1997 | Antkowiak et al. |
| 5,610,237 A | 3/1997 | Lawson et al. |
| 5,665,812 A | 9/1997 | Gorce et al. |
| 5,674,798 A | 10/1997 | Kitamura et al. |
| 5,698,646 A | 12/1997 | Kitamura et al. |
| 5,786,441 A | 7/1998 | Lawson et al. |
| 5,811,479 A | 9/1998 | Labauze |
| 5,852,189 A | 12/1998 | Hergenrother et al. |
| 5,912,343 A | 6/1999 | Lawson et al. |
| 5,932,662 A | 8/1999 | Lawson et al. |
| 5,935,893 A | 8/1999 | Lawson et al. |
| 6,013,718 A | 1/2000 | Cabioch et al. |
| 6,046,288 A | 4/2000 | Lawson et al. |
| 6,133,388 A | 10/2000 | Lee et al. |
| 6,184,338 B1 | 2/2001 | Schwindeman et al. |
| 6,252,007 B1 | 6/2001 | Oziomek et al. |
| 6,423,781 B1 | 7/2002 | Oziomek et al. |
| 2001/0036991 A1 | 11/2001 | Robert et al. |
| 2002/0183436 A1 | 12/2002 | Robert et al. |
| 2003/0153692 A1 | 8/2003 | Oshima et al. |
| 2004/0254301 A1 | 12/2004 | Tsukimawashi et al. |
| 2005/0203251 A1 | 9/2005 | Oshima et al. |
| 2006/0252861 A1 | 11/2006 | Halasa et al. |
| 2010/0108230 A1 | 5/2010 | Halasa et al. |
| 2010/0184912 A1 | 7/2010 | Marechal et al. |
| 2010/0249270 A1 | 9/2010 | Robert et al. |
| 2010/0252156 A1 | 10/2010 | Robert et al. |

FOREIGN PATENT DOCUMENTS

| EP | 0316255 A2 | 5/1989 |
| EP | 0451603 A2 | 10/1991 |

(Continued)

OTHER PUBLICATIONS

International Search Report (PCT/ISA/210) issued on Apr. 27, 2010, by European Patent Office as the International Searching Authority for International Application No. PCT/EP2009/067747.

*Primary Examiner* — William Cheung

(74) *Attorney, Agent, or Firm* — Buchanan Ingersoll & Rooney PC

(57) ABSTRACT

The present invention relates to a novel initiating system for the preparation of a living diene elastomer functionalized at the chain end by an amine group by anionic polymerization. The novel initiating system comprises an organolithium compound and a tin amide.

The invention also relates to processes for the preparation of modified elastomers comprising an amine group at the chain end. These modified elastomers prove to be particularly advantageous in reinforced rubber compositions for tyres as they confer improved dynamic and mechanical properties in the vulcanized state.

19 Claims, No Drawings

FOREIGN PATENT DOCUMENTS

| | | | |
|---|---|---|---|
| EP | 0551628 | A1 | 7/1993 |
| EP | 0553467 | A1 | 8/1993 |
| EP | 0590490 | A1 | 4/1994 |
| EP | 0590491 | A2 | 4/1994 |
| EP | 0593049 | A1 | 4/1994 |
| EP | 0600208 | A1 | 6/1994 |
| EP | 0622381 | A1 | 11/1994 |
| EP | 0626278 | A1 | 11/1994 |
| EP | 0692492 | A1 | 1/1996 |
| EP | 0692493 | A1 | 1/1996 |
| EP | 0693500 | A1 | 1/1996 |
| EP | 0693505 | A1 | 1/1996 |
| EP | 0709408 | A1 | 5/1996 |
| EP | 0718321 | A1 | 6/1996 |
| EP | 0725085 | A1 | 8/1996 |
| EP | 0736550 | A1 | 10/1996 |
| EP | 0736551 | A1 | 10/1996 |
| EP | 0741148 | A1 | 11/1996 |
| EP | 0747405 | A1 | 12/1996 |
| EP | 0778311 | A1 | 6/1997 |
| EP | 0786493 | A1 | 7/1997 |
| EP | 0850941 | A2 | 7/1998 |
| EP | 0850942 | A1 | 7/1998 |
| EP | 0850958 | A1 | 7/1998 |
| EP | 0890588 | A1 | 1/1999 |
| EP | 0894800 | A2 | 2/1999 |
| EP | 1036803 | A2 | 9/2000 |
| EP | 1127909 | A1 | 8/2001 |
| EP | 1334985 | A1 | 8/2003 |
| EP | 1457501 | A1 | 9/2004 |
| FR | 2918064 | A1 | 1/2009 |
| FR | 2918065 | A1 | 1/2009 |
| GB | 2368845 | A | 5/2002 |
| JP | 59-38209 | A | 3/1984 |
| JP | 2001-158834 | A | 6/2001 |
| JP | 2005-232367 | A | 9/2005 |
| WO | WO 96/18657 | A1 | 6/1996 |
| WO | WO 01/92402 | A1 | 12/2001 |
| WO | WO 2008/141702 | A1 | 11/2008 |
| WO | WO 2009/000750 | A1 | 12/2008 |
| WO | WO 2009/000752 | A1 | 12/2008 |
| WO | WO 2009/133068 | A1 | 11/2009 |

* cited by examiner

INITIATION SYSTEM FOR THE ANIONIC POLYMERIZATION OF CONJUGATED DIENES, AND METHOD FOR PREPARING DIENE ELASTOMERS

The present application is a U.S. National Stage Application filed under 35 U.S.C. 371 claiming priority from International Application No. PCT/EP2009/067747, filed Dec. 22, 2009, which claims the benefit of priority of France Application No. 0858988, filed on Dec. 23, 2008, which applications are incorporated herein by reference.

Now that savings in fuel and the need to protect the environment have become a priority, it is desirable to produce mixtures having good mechanical properties and a hysteresis which is as low as possible in order to be able to employ them in the form of rubber compositions which can be used in the manufacture of various semifinished products involved in the composition of tyre covers, such as, for example, underlayers, sidewalls or treads, and in order to obtain tyres having a reduced rolling resistance.

The reduction in the hysteresis of the mixtures is an ongoing objective which, however, has to be done while retaining the processability of the mixtures.

Numerous solutions have already been experimented with in order to achieve the objective of fall in hysteresis. Mention may in particular be made of the modification of the structure of the diene polymers and copolymers at the end of polymerization by means of functionalization, coupling or star-branching agents with the aim of obtaining a good interaction between the polymer, thus modified, and the filler, whether carbon black or a reinforcing inorganic filler.

The modified elastomers carrying an amine functional group at the chain end have the distinctive feature of resulting, by virtue of the interaction of the amine functional group with the filler, in a reduction in the hysteresis of the mixture.

The use of elastomers comprising an amine functional group at the chain end nevertheless results in a significant increase in the raw viscosity as a mixture, which results in a detrimentally affected processing. It turns out that the use of an elastomer modified by an amine functional group at the chain end and exhibiting another functionality, namely a coupling to tin, results in a good compromise in mechanical and dynamic properties.

The synthesis of this type of elastomer having two-fold functionality requires, in a first step, the formation of a living polymer chain having an amine functional group at the chain end. This functional group is generally introduced by initiation carried out using an aminated functional entity.

The synthesis of elastomers initiated by aminated initiators has been described for many years according to different synthesis processes.

Initiation using compounds having an amine-lithium functional group, known as NLi or N-Met (with Met denoting an alkali metal), which are insoluble in an aliphatic hydrocarbon solvent is described in U.S. Pat. Nos. 2,849,432, 3,935,177, JP 59038209 and EP 0 451 603. The initiators described are of the type comprising a dialkylamine $R_1R_2N$ or a cycloalkylamine $R_3N(R_3$ and also R1 R2 alkylene group, the main chain of which comprises a number of carbon atoms of less than or equal to 6). They are known for not being soluble in aliphatic hydrocarbon solvents. The NLi entity is formed, in a first step, by the reaction of an alkyllithium compound with a secondary amine.

Initiation using the NLi entities which are described in the preceding paragraph is carried out by dissolving the NLi entities in aliphatic solvents in the documents EP 0 590 490, EP 0 593 049, EP 0 622 381, EP 0 626 278 and EP 0 718 321.

Two routes have been developed for dissolving the NLi entities, described as insoluble "alone" in an aliphatic solvent:
  by the addition of a polar agent (at highly specific ratios) in order to form all NLi.(Polar agent)$_x$ entity,
  by the addition of monomer in order to form a prepolymer; an N(monomer)$_x$Li entity is then obtained which can make possible the (co)polymerization of butadiene and styrene.

Initiation by RNLi entities, with R a cyclic alkyl group, the main chain of which comprises more than 6 carbon atoms, which are soluble in aliphatic solvents is described in EP 0 590 491, EP 0 600 208, EP 0 709 408 or EP 0 741 148. From a certain size (carbon number of the main group greater than or equal to 7), lithium cyclic amides are soluble in aliphatic solvents. The NLi entity is formed by the reaction of an alkyllithium compound with a secondary amine (RNH).

Initiation by an entity generated by the reaction of a tin(II) diamide with an alkyllithium compound (or a lithium amide) is described in U.S. Pat. Nos. 5,463,003 and 5,463,004. The tin diamide is synthesized by the reaction of a lithium amide with $SnCl_2$ in the presence of a polar agent. The polymerization is subsequently initiated in two ways, either by the addition product of an alkyllithium compound and of this tin diamide or directly by the complex formed of this tin diamide and of a lithium amide. The authors indicate that the polymerization takes place by insertion of the monomer units between the amine-tin or carbon-tin bond. During polymerization, the elastomer is of $(R_2N\text{—}SBR\text{—})_2Sn\text{—}(R'\text{—}SBR)\text{—}Li$ type. It comprises both amine and tin functional groups. According to these authors, the addition of the tin diamide to a living polymer chain does not lead to the deactivation thereof.

Initiation by a magnesium complex used as transfer agent is described in EP 0 747 405. This patent claims the use of a compound of $(RN)_xMgR'_{3-x}Li$ type with R denoting a cyclic alkyl and R' an alkyl group. The authors indicate that the polymerization takes place by insertion of the monomer units between the amine-magnesium or carbon-magnesium bond. During polymerization, the elastomer, for example an SBR, initiated by $(RN)_2MgR'Li$, is of $(RN\text{—}SBR\text{—})_2Mg\text{—}(R'\text{—}SBR)\text{—}Li$ type. The magnesium diamide is generated by reaction of a dialkylmagnesium compound with two equivalents of secondary amine. The complex is formed by the addition reaction of the magnesium diamide and of an alkyllithium compound or of a lithium amide.

Initiation by compounds of R—N—R'—Li type, with R of cyclic alkylene type (valency of the nitrogen), or $R_1R_2N$—R'—Li type with $R_1$ and $R_2$ of alkyl or aryl type, is described in EP 0 316 255, EP 0 551 628, EP 0 553 467, WO 96/18657, EP 0 693 500, EP 0 693 505, EP 0 725 085, EP 0 736 550, EP 0 736 551, EP 0 850 941, EP 0 850 942, EP 0 850 958, EP 0 894 800, U.S. Pat. No. 6,184,338 and GB 2 368 845. These documents each describe R' groups which are different in nature. According to the authors of these documents, the initiators are soluble in aliphatic hydrocarbon solvents.

Initiation by an entity formed by the addition reaction of an alkyllithium compound with the double bond of a compound having a tertiary amine functional group is described in EP 1 036 803 and EP 1 334 985. This process requires the use of compounds of diphenylethylene mono- or difunctional amine type. The product from the reaction of this entity with an alkyllithium generates a tertiary alkyl mono- or difunctional amine which makes it possible to initiate the polymerization of styrene and butadiene.

The aim of the invention is to prepare living linear elastomers, modified at the chain end by an amine functional group, which are capable of being modified with regard to the other chain end by a functionalization, coupling or star-branching agent.

This aim is achieved in that the inventors have discovered a novel initiating system which makes possible both the synthesis of living elastomers functionalized by an amine group at the chain end and which exhibits advantages in terms of industrial use as initiators are soluble in polymerization solvents. In addition, the inventors have demonstrated that, when the functionalized living elastomers obtained with this novel initiating system are modified, in particular by coupling to tin, it is possible to produce reinforced rubber compositions exhibiting a markedly reduced hysteresis. This improvement in the hysteresis properties is particularly favourable to use of such compositions in the manufacture of tyres.

Thus, a first subject-matter of the invention is a novel initiating system for the preparation of living diene elastomers functionalized by an amine group at the chain end, characterized in that it comprises an organolithium compound and a tetravalent tin amide.

Another subject-matter of the invention is a process for the preparation of a living diene elastomer functionalized by an amine group at the chain end, characterized in that it comprises a stage of polymerization of at least one conjugated diene monomer by reaction with an initiating system comprising an organolithium compound and a tin amide.

Another subject-matter of the invention is a process for the preparation of a modified diene elastomer comprising an amine functional group at the chain end(s), the said process comprising a first stage of polymerization of at least one conjugated diene monomer by reaction with an initiating system comprising an organolithium compound and a tin amide followed by a stage of modification, by means of a modifying agent, of the living elastomer obtained in the preceding stage.

In the present description, unless expressly indicated otherwise, all the percentages (%) indicated are % by weight. Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b).

A subject-matter of the invention is thus a novel initiating system for the preparation of living diene elastomers functionalized by an amine group at the chain end, characterized in that it comprises an organolithium compound and a tetravalent tin amide, which does not comprise a tin-lithium bond, denoted Sn—Li.

The term "organolithium compound" is understood to mean, according to the invention, a hydrocarbon compound comprising a carbon-lithium bond, represented by the formula RLi, in which R represents an alkyl, aryl or cycloalkyl radical comprising from 1 to 20 carbon atoms.

Aliphatic organolithium compounds are preferred compounds. Representative compounds among these are ethyllithium, n-butyllithium (n-BuLi) and isobutyllithium.

The term "tin amide" is understood to mean, according to the invention, a compound corresponding to the formula $Sn(NR_1R_2)_a(NR_3)_b(R_4)_c$, in which $R_1$ and $R_2$ denote an alkyl, cycloalkyl or aryl radical comprising from 1 to 20 carbon atoms, $R_3$ denotes a branched or unbranched cyclic alkyl radical comprising from 3 to 16 carbon atoms, $R_4$ denotes an alkyl, cycloalkyl or aryl radical comprising from 1 to 20 carbon atoms, and a, b and c are integers between 0 and 4 with the proviso that a+b+c=4 and a+b≧1.

More preferably still, the tin amide is chosen from hexamethyleneiminetributyltin, pyrrolidinetributyltin and (2-methylpyrrolidine)tributyltin.

The initiating system according to the invention comprises the organolithium compound and the tin amide in proportions such that the molar ratio of the organolithium compound to the tin amide varies from 1/1 to 8/1. Preferably, as many moles of organolithium compound will be introduced as moles of amine groups present in the tin amide; the molar ratio of the organolithium compound to the amine groups of the tin amide is preferably 1/1. These molar ratio values are given with an approximation due to the uncertainty with regard to the measurement of +/−0.1.

Another subject-matter of the invention is a process for the preparation of a living diene elastomer functionalized by an amine group at the chain end, characterized in that it comprises a stage of polymerization of at least one conjugated diene monomer by reaction with an initiating system comprising an organolithium compound and a tin amide.

The term "diene elastomer" is understood to mean, according to the invention, any homopolymer obtained by polymerization of a conjugated diene monomer having from 4 to 12 carbon atoms, or any copolymer obtained by copolymerization of one or more conjugated dienes with one another or with one or more vinylaromatic compounds having from 8 to 20 carbon atoms. In the case of copolymers, the latter comprise from 20 to 99% by weight of diene units and from 1 to 80% by weight of vinylaromatic units.

Suitable in particular as conjugated diene monomers which can be used in the process in accordance with the invention are 1,3-butadiene, 2-methyl-1,3-butadiene, 2,3-di($C_1$ to $C_5$ alkyl)-1,3-butadiene, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, and the like.

Suitable in particular as vinylaromatic compounds are styrene, ortho-, meta- or para-methylstyrene, the "vinyltoluene" commercial mixture, para-(tert-butyl)styrene, methoxystyrenes, vinylmesitylene, divinylbenzene, vinylnaphthalene, and the like.

The diene elastomer is preferably chosen from polybutadienes, butadiene-styrene copolymers, butadiene-styrene-isoprene copolymers and polyisoprene. Advantageously, the diene elastomer is a butadiene-styrene copolymer.

Polybutadienes are therefore suitable, in particular those having a content (mol %) of 1,2-units of between 4% and 80% or those having a content (mol %) of cis-1,4-units of greater than 80%, polyisoprenes, butadiene-styrene copolymers, in particular those having a Tg (glass transition temperature (Tg, measured according to ASTM D3418)) of between 0° C. and −80° C. and more particularly between −10° C. and −70° C., a styrene content of between 5% and 60% by weight and more particularly between 20% and 50% by weight, a content (mol %) of 1,2-bonds of the butadiene part of between 4% and 75% and a content (mol %) of trans-1,4-bonds of between 10% and 85%, butadiene-isoprene copolymers, in particular those having an isoprene content of between 5% and 90% by weight and a Tg of −40° C. to −80° C., or isoprene-styrene copolymers, in particular those having a styrene content of between 5% and 50% by weight and a Tg of between 0° C. and −50° C., preferably between −25° C. and −50° C. In the case of butadiene-styrene-isoprene copolymers, those having a styrene content of between 5% and 50% by weight, an isoprene content of between 15% and 60% by weight and a butadiene content of between 5% and 50% by weight, more generally any butadiene-styrene-isoprene copolymer having a Tg of between −20° C. and −70° C., are suitable in particular.

According to an alternative form of the process according to the invention, the components of the initiating system are added to the polymerization medium, composed of the monomer or monomers and of the solvent, separately, in a simultaneous or sequential fashion. In the latter case, it is preferable to introduce the tin amide into the reaction medium before the introduction of the organolithium compound.

The polymerization is carried out in the presence of an inert solvent, which can be an aliphatic or alicyclic hydrocarbon, such as pentane, hexane, isooctane, cyclohexane or methylcyclohexane, or an aromatic hydrocarbon, such as benzene, toluene or xylene. The ratio by weight of the solvent to the monomer(s) before the polymerization reaction is preferably between 1 and 15, more preferably still between 4 and 7.

The polymerization process can be carried out continuously or batchwise.

The solution to be polymerized can also comprise a polar agent of ether type, such as tetrahydrofuran, or of amine type, such as tetramethylethylenediamine. Several types of polar agents can be used, including nonchelating polar agents of THF type and chelating polar agents having, on at least two atoms, at least one nonbonding doublet, such as, for example, of tetrahydrofurfuryl ethyl ether or tetramethylethylenediamine type.

It is also possible to add randomizing agents, such as sodium alkoxides.

The polymerization is generally carried out between 15 and 150° C., preferably between 30 and 100° C.

On conclusion of this polymerization stage, a living diene elastomer functionalized by an amine group at the chain end is obtained.

The polymerization can be halted at the end of the reaction so as to obtain a diene elastomer functionalized by an amine group at the chain end. Halting is carried out in a way known per se, for example with methanol or water.

Alternatively, the polymerization can be halted by a modifying agent, in a way known per se, in order to obtain a modified diene elastomer comprising an amine group at the chain end. Such a process also forms the subject-matter of the invention.

Thus, a subject-matter of the invention is composed of a process for the preparation of a modified diene elastomer comprising an amine functional group at least one of its ends, the said process comprising a first stage of polymerization of at least one conjugated diene monomer by reaction with an initiating system comprising an organolithium compound and a tin amide, followed by a stage of modification, by means of a modifying agent, of the living elastomer obtained in the preceding stage.

The term "modified diene elastomer" is understood to mean an elastomer functionalized at the chain end, coupled or star-branched by a group other than an amine group. This group results from the modifying agent.

Thus, according to the invention, an elastomer functionalized at the chain end is a linear elastomer which comprises, at one chain end, an amine functional group and, at the other chain end, another functional group.

A coupled elastomer, according to the invention, is a linear elastomer composed of two elastomeric chains bonded to one another by a functional group other than an amine functional group, the said elastomer comprising an amine functional group at each of its two ends.

A star-branched elastomer, according to the invention, is composed of several (at least three) elastomer branches bonded to one another by a functional group other than an amine functional group, the said elastomer comprising an amine functional group at each of its branches.

The modifying agents which make it possible to modify the living elastomer obtained in the preceding polymerization stage are known.

They are, according to an alternative form of the invention, functionalization, coupling or star-branching agents of tin halide or silicon halide type. Preferably, the choice is made of tin-based coupling agents of $R_2SnX_2$ type, with R a $C_1$-$C_{12}$ alkyl radical and X a halogen atom, preferably chlorine, for example $Bu_2SnCl_2$ or a $Bu_2SnCl_2$ and $SnCl_4$ mixture. Alternatively, also preferably, the choice is made of silicon-based coupling agents, such as are described in the patent application on behalf of the Applicant Companies WO 08/141,702, of $MeSiX_3$ type (optionally in stoichiometric excess in order to carry out the synthesis of SBR having a silanol functional group in the middle of the chain), or such as are described in the patent applications on behalf of the Applicant Companies FR 2 918 064 and FR 2 918 065, of $SiX_2$-polyether-$SiX_2$ type, X being a halogen atom, preferably chlorine.

According to another alternative form of the invention, the functionalization, coupling or star-branching agents are capable of introducing a group comprising a polar functional group. This polar functional group can be chosen, for example, from functional groups of the following types: silanol, alkoxysilane, alkoxysilane carrying a group of the following types: amine, epoxide, ether, ester, hydroxyl, carboxylic acid, and the like. This functional group improves in particular the interaction between the reinforcing inorganic filler of a rubber composition and the elastomer. Such modified elastomers are known per se and are described in the prior art.

More particularly, mention may be made, among the modified diene elastomers according to the invention, of:

elastomers carrying a silanol functional group, the silanol functional group being situated either at the chain end or in the middle of the chain. When it is situated at the chain end, the silanol functional group can be carried by a polysiloxane block. Functionalized elastomers of this type are described, for example, in Patent Applications EP 0 778 311 A1, EP 0 786 493 A1 and WO 08/141,702, the descriptions of which are introduced here by way of reference, elastomers modified by one or more carboxylic acid groups, such as are described, for example, in Application WO 01/92402, chain-end functionalized, coupled or star-branched elastomers resulting from the functionalization of the diene elastomers by an agent corresponding to the general formula:

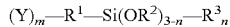

in which:

Y represents the

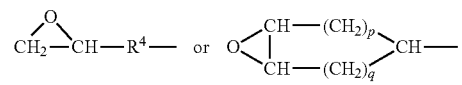

residues $R^1$ represents an alkyl, cycloalkyl or aryl residue having from 1 to 10 carbon atoms, $R^2$ represents an alkyl, aryl, cycloalkyl, alkaryl or aralkyl residue having from 1 to 12 carbon atoms, R³ represents an alkyl, aryl or alkaryl residue having from 1 to 12 carbon atoms, R⁴ represents a hydrocarbon residue which has from 1 to 6 carbon atoms and which can comprise one or more oxygen atoms in the hydrocarbon chain, n is an integer chosen from the values 0 or 1, m is an integer chosen from the values 1 or 2, p and q are integers chosen from the values 0, 1, 2, 3 or 4, it being understood that the sum p+q must represent an integer between 2 and 5 inclusive.

Functionalized elastomers of this type are described, for example, in Patent Applications EP 0 692 492 A1 and EP 0 692 493 A1, the descriptions of which are introduced here by way of reference.

chain-end functionalized, coupled or star-branched elastomers resulting from the modification of the diene elastomers by an agent of alkoxysilane type carrying a cyclic or noncyclic and tertiary, secondary or primary amine group. Functionalized elastomers of this type are described, for example, in Patent Applications US 2005/0203251, JP 2001158834, JP 2005232367, EP 1 457 501 A1 and PCT/EP09/055,061, the descriptions of which are introduced here by way of reference. Advantageously, the diene elastomer thus modified is coupled by an alkoxysilane group bonded to the diene elastomer by the silicon atom and carrying an amine group.

The term "modified diene elastomer" is also understood to mean, according to the invention, a block elastomer comprising at least one polar block, the latter more particularly being a polyether block. These block elastomers comprise at least the said polar block at the end of the polymer chain or in the middle of the chain, or else these block elastomers can be provided in the star-branched form with at least one central polar block to which several, that is to say more than two, polymer chains are bonded. These block elastomers are generally obtained by reaction of a living diene elastomer with a modifying agent having a functional polyether block. Such elastomers are, for example, described in Patent Applications EP 1 127 909 A1, WO 09/000,750 and WO 09/000,752, the descriptions of which are introduced here by way of reference.

The amount of modifying agent is such that the molar ratio of modifying agent to the content of living polymer is between 0.25 and 1.0. Preferably, a ratio of between 0.3 and 0.7 will be chosen. The reaction for modifying the living diene elastomer can take place at a temperature of between −20° C. and 100° C. by addition of the modifying agent to the living polymer strings or vice versa. This reaction can, of course, be carried out with one or more modifying agents.

The mixing of the living elastomer with the modifying agent can be carried out by any appropriate means, in particular using any mixer having available stirring of static type and/or any dynamic mixer of fully stirred type known to a person skilled in the art. The latter determines the time for reaction between the living diene elastomer and the modifying agent. By way of example, this time can be between 10 seconds and 2 hours.

Of course, one or more antioxidants can be added to the reaction mixture before recovering the functionalized polymer. The modified polymer is separated from the reaction medium by conventional techniques, that is to say either by coagulation or by steam distillation of the solvent or by evaporation by whatever means, such as, for example, evaporation under vacuum, followed by drying, if necessary.

The process according to the invention makes it possible to obtain modified diene elastomers having a Mooney viscosity which can extend over a broad scale between 10 and 150 and preferably between 30 and 100.

The modified diene elastomers obtained according to the process of the invention confer improved dynamic and mechanical properties on the vulcanized reinforced rubber compositions in which they are present, which renders these modified diene elastomers very particularly suitable for the preparation of tyres, more particularly of tyre treads, in particular as a result of the low level of hysteresis achieved.

In addition, the modified diene elastomers obtained according to the process of the invention confer satisfactory processing properties on the nonvulcanized compositions comprising the reinforcing filler, in particular an extrudability or an ability to be drawn using an extruder compatible with industrial devices.

The reinforcing filler for forming these rubber compositions can be of any type appropriate for a tyre application, for example silica, carbon black or a black/silica blend.

The abovementioned characteristics of the present invention, and others, will be better understood on reading the following description of several implementation examples of the invention, given by way of illustration and without implied limitation.

Synthesis of the Tin Amide

Example 1

Synthesis of Hexamethyleneiminetributyltin 130 ml of methylcyclohexane, 60 mmol of hexamethyleneimine and then 61.2 mmol of n-butyllithium are introduced into a 250 ml Steinie bottle washed and dried beforehand. The reaction mixture is subsequently stirred for 10 min. 58.8 mmol of tributyltin chloride are subsequently added dropwise. The mixture obtained is stirred at ambient temperature for one hour. The tin amide thus obtained is soluble in the methylcyclohexane solution, in contrast to the lithium chloride, which precipitates. It is subsequently used crude in solution in the methylcyclohexane.

Example 2

Synthesis of Pyrrolidinetributyltin

The procedure is the same as in Example 1, the hexamethyleneimine being replaced with pyrrolidine.

Example 3

Synthesis of (2-methylpyrrolidine)tributyltin

The procedure is the same as in Example 1, the hexamethyleneimine being replaced with 2-methylpyrrolidine.

Preparation of a Modified Diene Elastomer

Example 4

Synthesis of SBR A not in Accordance with the Invention 6,6 l of methylcyclohexane, 532 g of butadiene, 197 g of styrene and 0.58 g of tetrahydrofurfuryl ethyl ether are introduced into a 10 l reactor under nitrogen. After neutralizing the impurities with n-butyllithium, 3.05 mmol of butyllithium are injected. The polymerization is carried out at 50° C. for 50 minutes. A conversion of 95% of the monomers is measured by weighing an extract dried at 150° C. under reduced pressure (200 mmHg). An excess of methanol is subsequently introduced into the reactor.

The coupled polymer obtained is subjected to an antioxidizing treatment by addition of 0.40 part per 100 parts of elastomers (phr) of 4,4'-methylenebis (2,6-di(tert-butyl)phenol) and 0.20 part per 100 parts of elastomers (phr) of N-(1, 3-dimethylbutyl)-Ns-phenyl-p-phenylenediamine. This polymer is recovered after stripping and then drying on an open mill.

The intrinsic viscosity, measured in toluene at 25° C. at a concentration of 0.1 g/dl, of the polymer obtained is 1.85 dl/g. The ML viscosity of the polymer is 68.

The microstructure of this polymer is determined by $^{13}C$ NMR:

The content by weight of trans-1,4-BR is 20.5%, that of cis-1,4-BR is 19.2% and that of 1,2-BR is 60.3%. The content by weight of styrene is 25.4%.

The molecular weight Mn of this polymer, determined by the SEC technique, is 166 000 g.mol$^{-1}$ and the PI is 1.15.

Example 5

Synthesis of SBR B Initiated by (2-Methylpynolidine)Tributyltin According to the Invention 6.6 l of methylcyclohexane, 532 g of butadiene, 197 g of styrene and 0.55 g of tetrahydrofurfuryl ethyl ether are introduced into a 10 l reactor under nitrogen. After neutralizing the impurities with n-butyllithium, 6.48 mmol of (2-methylpyrrolidine)tributyltin, formed according to example 3, and then 6.51 mmol of n-butyllithium are injected. The polymerization is carried out at 45° C. for 45 minutes. A conversion of 96% of the monomers is measured by weighing an extract dried at 150° C. under reduced pressure (200 mmHg).

A sample is withdrawn before the coupling reaction into a 250 ml Steinie bottle containing an excess of methanol. The intrinsic viscosity of the sample, which is measured at 25° C. in toluene at a concentration of 0.1 g/dl, is 1.18 dl/g. The molecular weight Mn, determined by the SEC technique, is 104 000 g/mol and the PI is 1.15.

2.94 mmol of dibutyltin chloride are subsequently introduced into the reactor. After reacting at 60° C. for 30 min, an excess of methanol is injected into the reactor.

The coupled polymer obtained is subjected to an antioxidizing treatment by addition of 0.80 part per 100 parts of elastomers (phr) of 4,4'-methylenebis (2,6-di(tert-butyl)phenol) and 0.20 part per 100 parts of elastomers (phr) of N-(1, 3-dimethylbutyl)-N'-phenyl-p-phenylenediamine. This polymer is recovered after stripping and then drying on an open mill.

The intrinsic viscosity, measured in toluene at 25° C. at a concentration of 0.1 g/di, of the polymer obtained is 1.84 Wig. The leap in viscosity, ratio of the viscosity of the coupled polymer to the viscosity of the sample withdrawn before coupling, is 1.56. The ML viscosity of the polymer is 68.

The microstructure of this polymer is determined by $^{13}C$ NMR:

The content by weight of trans-1,4-BR is 20.3%, that of cis-1,4-BR is 19.0% and that of 1,2-BR is 60.7%. The content by weight of styrene is 25.0%.

The molecular weight Mn of this polymer, determined by the SEC technique, is 174 000 g.mol$^{-1}$ and the PI is 1.24.

The content of tertiary amine groups bonded to the polymer via a 1,4-butadienyl unit, determined by $^1H$ NMR, is 55%.

Example 6

Synthesis of SBR C Initiated by Pyrrolidinetributyltin According to the Invention 6.6 l of methylcyclohexane, 532 g of butadiene, 197 g of styrene and 0.46 g of tetrahydrofurfuryl ethyl ether are introduced into a 10 l reactor under nitrogen. After neutralizing impurities with n-butyllithium, 5.84 mmol of pyrrolidinetributyltin, formed according to Example 2, and then 5.89 mmol of n-butyllithium are injected. The polymerization is carried out at 45° C. for 45 minutes. A conversion of 96% of the monomers is measured by weighing an extract dried at 150° C. under reduced pressure (200 mmHg).

A sample is withdrawn before the coupling reaction into a 250 ml Steinie bottle containing an excess of methanol. The intrinsic viscosity of the sample, which is measured at 25° C. in toluene at a concentration of 0.1 g/dl, is 1.18 dl/g. The molecular weight Mn, determined by the SEC technique, is 101 000 g/mol and the PI is 1.20.

2.78 mmol of dibutyltin chloride are subsequently introduced into the reactor. After reacting at 60° C. for 30 min, an excess of methanol is injected into the reactor.

The coupled polymer obtained is subjected to an antioxidizing treatment by addition of 0.80 part per 100 parts of elastomers (phr) of 4,4'-methylenebis (2,6-di(tert-butyl)phenol) and 0.20 part per 100 parts of elastomers (phr) of N-(1, 3-dimethylbutyl)-N'-phenyl-p-phenylenediamine. This polymer is recovered after stripping and then drying on an open mill.

The intrinsic viscosity, measured in toluene at 25° C. at a concentration of 0.1 g/dl, of the polymer obtained is 1.77 dl/g. The leap in viscosity, ratio of the viscosity of the coupled polymer to the viscosity of the sample withdrawn before coupling, is 1.50. The ML viscosity of the polymer is 69.

The microstructure of this polymer is determined by $^{13}C$ NMR:

The content by weight of trans-1,4-BR is 21.6%, that of cis-1,4-BR is 19.5% and that of 1,2-BR is 58.9%. The content by weight of styrene is 24.8%.

The molecular weight Mn of this polymer, determined by the SEC technique, is 164 000 g.mol$^{-1}$ and the PI is 1.25.

The content of tertiary amine groups bonded to the polymer via a 1,4-butadienyl unit, determined by $^1H$ NMR, is 55%.

Example 7

Synthesis of SBR D Initiated by Hexamethyleneiminetributyltin According to the Invention 6.6 l of methylcyclohexane, 532 g of butadiene, 197 g of styrene and 0.52 g of tetrahydrofurfuryl ethyl ether are introduced into a 10 l reactor under nitrogen. After neutralizing the impurities with n-butyllithium, 6.71 mmol of hexamethyleneiminetributyltin, formed according to Example 1, and then 6.72 mmol of n-butyllithium are injected. The polymerization is carried out at 45° C. for 45 minutes. A conversion of 95% of the monomers is measured by weighing an extract dried at 150° C. under reduced pressure (200 mmHg).

A sample is withdrawn before the coupling reaction into a 250 ml Steinie bottle containing an excess of methanol. The intrinsic viscosity of the sample, which is measured at 25° C. in toluene at a concentration of 0.1 g/dl, is 1.12 dl/g. The molecular weight Mn, determined by the SEC technique, is 99 000 g/mol and the PI is 1.10.

3.22 mmol of dibutyltin chloride are subsequently introduced into the reactor. After reacting at 60° C. for 30 min, an excess of methanol is injected into the reactor.

The coupled polymer obtained is subjected to an antioxidizing treatment by addition of 0.80 part per 100 parts of elastomers (phr) of 4,4'-methylenebis(2,6-di(tert-butyl)phenol) and 0.20 part per 100 parts of elastomers (phr) of N-(1,3-dimethylbutyl)-N'-phenyl-p-phenylenediamine. This polymer is recovered after stripping and then drying on an open mill.

The intrinsic viscosity, measured in toluene at 25° C. at a concentration of 0.1 g/di, of the polymer obtained is 1.71 dl/g. The leap in viscosity, ratio of the viscosity of the coupled polymer to the viscosity of the sample withdrawn before coupling, is 1.53. The ML viscosity of the polymer is 70.

The microstructure of this polymer is determined by $^{13}C$ NMR:

The content by weight of trans-1,4-BR is 20.5%, that of cis-1,4-BR is 19.5% and that of 1,2-BR is 60.0%. The content by weight of styrene is 25.2%.

The molecular weight Mn of this polymer, determined by the SEC technique, is 164 000 g.mol$^{-1}$ and the PI is 1.20.

The content of tertiary amine groups bonded to the polymer via a 1,4-butadienyl unit, determined by $^1H$ NMR, is 55%.

Comparative Examples of Rubber Compositions

A) Measurements and Tests Used a) the Mooney ML (large rotor) or MS (small rotor) (1+4) viscosity at 100° C.: measured according to Standard ASTM: D-1646, entitled "Mooney" in the tables,
(b) the Shore A hardness: measurements carried out according to Standard DIN 53505,
(c) the elongation moduli at 300% (EM 300), at 100% (EM 100) and at 10% (EM 10): measurements carried out according to Standard ISO 37,
(d) the Scott fracture index at 23° C.: the tensile strength (TS) is determined in MPa and the elongation at break (EB) is determined in %. All these tensile measurements are carried out under the standard conditions of temperature and humidity according to Standard ISO 37,
(e) the dynamic properties $\Delta G^*$ and $\tan(\delta)max$ are measured on a viscosity analyzer (Metravib VA4000) according to Standard ASTM D 5992-96. The response of a sample of vulcanized composition (cylindrical test specimen with a thickness of 2 mm and with a cross section of 79 mm$^2$), subjected to a simple alternating sinusoidal shear stress, at a frequency of 10 Hz, under the standard temperature conditions (23° C.) according to Standard ASTM D 1349-99, is recorded. A peak-to-peak strain amplitude sweep is carried out from 0.1 to 50% (outward cycle) and then from 50 to 0.1% (return cycle). The results made use of are the complex dynamic shear modulus (G*) and the loss factor tan δ. The maximum value of tan δ observed (tan(δ)max), and the difference in complex modulus ($\Delta G^*$) between the values at 0.1% and 50% strain (Payne effect), are shown for the return cycle.

B) Example

In this example, the four elastomers SBR A, SBR B, SBR C and SBR D were used for the preparation of rubber compositions A, B, C and D each comprising carbon black and silica as reinforcing filler.

Each of these compositions A, B, C and D exhibits the following formulation (expressed in phr: parts per hundred parts of elastomer):

| Elastomer | 100 |
|---|---|
| N234 | 35 |
| Silica (1) | 35 |
| Oil (2) | 24.5 |
| X50S (3) | 5.6 |
| Diphenylguanidine | 0.7 |
| Antioxidant (4) | 1.9 |
| Antiozone wax | 1.5 |
| Stearic acid | 2 |
| ZnO | 2.5 |
| Sulfenamide (5) | 1.3 |
| Sulphur | 1.3 |

(1) = Silica, "Zeosil 1165 MP" from Rhodia
(2) = Oil, Tufflo 2000
(3) = from Degussa
(4) = N-(1,3-Dimethylbutyl)-N'-phenyl-p-phenylenediamine ("Santoflex 6-PPD" from Flexsys)
(5) = CBS from Flexsys Each of the following compositions is produced, in a first step, by a thermomechanical working and then, in a second finishing step, by mechanical working.

The elastomer, the silica, the oil, the diphenylguanidine, the X50S, the antioxidant, the stearic acid and the wax are successively introduced into a laboratory internal mixer of "Banbury" type, the capacity of which is 400 cm$^3$, which is 75% filled and which has a starting temperature of approximately 70° C., followed, approximately 40 seconds later, by the black and then, approximately three minutes later or at 150° C., by the zinc monoxide.

The stage of thermomechanical working is carried out for 5 to 6 minutes, up to a maximum dropping temperature of approximately 160° C.

The first abovementioned step of thermomechanical working is thus carried out, it being specified that the mean speed of the blades during this first step is 70 revolutions/min.

The mixture thus obtained is recovered and cooled and then, in an external mixer (homofinisher), the sulphur and the sulfenamide are added at 30° C., the combined mixture being further mixed for a time of 3 to 4 minutes (second abovementioned step of mechanical working).

The compositions thus obtained are subsequently calendered, either in the form of plaques (with a thickness ranging from 2 to 3 mm) or fine sheets of rubber, for the measurement of their physical or mechanical properties, or in the form of profiled elements which can be used directly, after cutting and/or assembling to the desired dimensions, for example as semifinished products for tyres, in particular for treads.

The results are recorded in the table below:

| | Composition | | | |
|---|---|---|---|---|
| | A | B | C | D |
| Elastomer | SBR A | SBR B | SBR C | SBR D |
| ML 1 + 4 at 100° C. (elastomer) | 67.5 | 67.5 | 69.7 | 69.7 |
| Properties in the noncrosslinked state | | | | |
| MS 1 + 4 at 100° C. ("Mooney mixture") | 46.1 | 47.3 | 45.2 | 48.0 |
| Properties in the crosslinked state | | | | |
| Shore A | 69.1 | 64.5 | 64.3 | 64.9 |
| EM10 | 5.79 | 4.53 | 4.48 | 4.66 |

-continued

| | Composition | | | |
|---|---|---|---|---|
| | A | B | C | D |
| EM100 | 2.25 | 2.25 | 2.18 | 2.28 |
| EM300 | 2.54 | 3.09 | 3.02 | 3.17 |
| EM300/EM100 | 1.13 | 1.37 | 1.38 | 1.39 |
| Scott fracture index at 23° C. | | | | |
| TS (MPa) | 17.8 | 18.3 | 18.0 | 19.4 |
| EB (%) | 461 | 385 | 387 | 395 |
| Dynamic properties as a function of the strain | | | | |
| Delta G* (MPa) at 23° C. | 6.95 | 2.32 | 2.11 | 2.48 |
| Tan (δ) max at 23° C. | 0.394 | 0.296 | 0.279 | 0.302 |

It should be noted that the compositions B, C and D according to the invention exhibit a "Mooney mixture" value equivalent to that of the composition A based on a nonfunctional elastomer. The elastomers B, C and D which carry an amine functional group and which are coupled to tin according to the invention have a processing equivalent in the noncrosslinked state to the nonfunctional elastomer.

As regards the properties in the crosslinked state, it should be noted that the EM300/EM100 ratios of the compositions B, C and D according to the invention are greater than that of the composition A based on a nonfunctional elastomer. The elastomers B, C and D which carry an amine functional group and which are coupled to tin according to the invention make it possible to improve the strengthening, with respect to the nonfunctional elastomer.

As regards the dynamic properties, it should be noted that the ΔG* and tan(δ)max values of the compositions B, C and D according to the invention are lower than those of the composition A based on a nonfunctional elastomer. The elastomers B, C and D which carry an amine functional group and which are coupled to tin according to the invention make it possible to improve the hysteresis properties, with respect to the nonfunctional elastomer A.

In other words, the compositions B, C and D according to the invention based on elastomers which carry an amine functional group and which are coupled to tin exhibit rubber properties in the noncrosslinked state and in the crosslinked state which are improved, with respect to those of the composition A based on a nonfunctional elastomer, as the result of a markedly reduced hysteresis, with equivalent processing.

The invention claimed is:

1. Initiating system for the preparation of living diene elastomers functionalized by an amine group at the chain end, wherein it comprises an organolithium compound and a tetravalent tin amide not having an Sn—Li bond.

2. Initiating system according to claim 1, wherein the molar ratio of the organolithium compound to the tetravalent tin amide varies from 1/1 to 8/1.

3. Initiating system according to claim 1 wherein, the molar ratio of the organolithium compound to the amine groups of the tetravalent tin amide is 1/1.

4. Initiating system according to claim 1, wherein the organolithium compound is a hydrocarbon compound represented by the formula RLi, in which R represents an alkyl, aryl or cycloalkyl radical comprising from 1 to 20 carbon atoms.

5. Initiating system according to claim 4, wherein the organolithium compound is chosen from ethyllithium, n-butyllithium (n-BuLi) or isobutyllithium.

6. Initiating system according to claim 1, wherein the tetravalent tin amide is a compound corresponding to the formula $Sn(NR_1R_2)_a(NR_3)_b(R_4)_c$, in which $R_1$ and $R_2$ denote an alkyl, cycloalkyl or aryl radical comprising from 1 to 20 carbon atoms, $R_3$ denotes a branched or unbranched cyclic alkyl radical comprising from 3 to 16 carbon atoms, $R_4$ denotes an alkyl, cycloalkyl or aryl radical comprising from 1 to 20 carbon atoms, and a, b and c are integers between 0 and 4 with the proviso that $a+b+c=4$ and $a+b \geq 1$.

7. Initiating system according to claim 6, wherein the tin amide is chosen from hexamethyleneiminetributyltin, pyrrolidinetributyltin and (2-methylpyrrolidine)tributyltin.

8. Process for the preparation of a living diene elastomer functionalized by an amine group at the chain end, comprising a stage of polymerization of at least one conjugated diene monomer by reaction with an initiating system as defined in claim 1 in a polymerization medium.

9. Process according to claim 8, wherein the conjugated diene monomer is copolymerized with a vinylaromatic compound.

10. Process according to claim 9, wherein the vinylaromatic compound is styrene.

11. Process according to claim 8, wherein the conjugated diene monomer is butadiene.

12. Process according to claim 8, wherein the polymerization medium comprises an inert organic solvent.

13. Process according to claim 12, wherein the ratio by weight of the solvent to the monomer(s) before the polymerization reaction varies from 4 to 7.

14. Process according to claim 8, wherein the components of the initiating system are added to the polymerization medium separately.

15. Process according to claim 14, wherein the tetravalent tin amide is added to the polymerization medium before the introduction of the organolithium compound.

16. Process for the preparation of a modified diene elastomer comprising an amine functional group at at least one of its ends, comprising:
   (i) a stage of preparation of a living diene elastomer functionalized by an amine group at the chain end according to the process defined in claim 8, and
   (ii) a stage of modification by means of a modifying agent of the living elastomer obtained in the preceding stage.

17. Process according to claim 16, wherein the stage of modification is carried out by means of a functionalization, coupling or star-branching agent chosen from tin halides, silicon halides and agents capable of introducing a group comprising a polar functional group, or of a modifying agent having a functional polyether block.

18. Process according to claim 17, wherein the coupling agent is represented by the formula $R_2SnX_2$, with R denoting a $C_1$-$C_{12}$ alkyl radical and X denoting a halogen atom.

19. Process according to claim 18, wherein the coupling agent is dibutyltin chloride.

* * * * *